United States Patent [19]

Kitabatake

[11] Patent Number: 5,890,112
[45] Date of Patent: Mar. 30, 1999

[54] MEMORY REDUCTION FOR ERROR CONCEALMENT IN SUBBAND AUDIO CODERS BY USING LATEST COMPLETE FRAME BIT ALLOCATION PATTERN OR SUBFRAME DECODING RESULT

[75] Inventor: Osamu Kitabatake, Kanagawa, Japan

[73] Assignee: NEC Corporation, Tokyo, Japan

[21] Appl. No.: 734,302

[22] Filed: Oct. 21, 1996

[30]       Foreign Application Priority Data

Oct. 25, 1995 [JP] Japan .................................... 7-277329

[51] Int. Cl.$^6$ ....................................................... G10L 7/04
[52] U.S. Cl. .......................... 704/229; 704/205; 704/500
[58] Field of Search .................................. 704/205, 229, 704/268, 500

[56]                References Cited

U.S. PATENT DOCUMENTS 5,649,029    7/1997    Galbi ........................................ 382/232

OTHER PUBLICATIONS

Peter Noll, "MPEG Digital Audio Coding," IEEE Signal Processing Magazine, p. 59–81, Sep. 1997.
Brian Bryden, Gerald E. Seguin, Jean Conan, Vijay K. Vhargava, and Andre Brind'Amour, "Error Correction/Masking for Digital Voice Transmission Over the Land Mobile Satellite System,"IEEE Trans. Communications, vol. 37, No. 3, pp. 309–314, Mar. 1989.
Detlef Wiese, Optimization of Error Detection anf Concealment for ISO/MPEG/AUDIO CODECs Layer–I and II, 93rd Audio Engineering Convention preprint 3368 (D–5), Oct. 1992.
Karl–Heinz Brandenburg and Gerhard Stoll, "ISO–MPEG–1 Audio: A Generic Standard for Coding of High–Quality Digital Audio," J. Audio Engineering Society, vol. 42, No. 10, pp. 780–792, Oct. 1994.
Information Technology—Coding of Moving Pictures And Associated Audio For Digital Storage Media At Up to About 1,5 Mbit/s—, ISO/IEC (Aug. 1, 1993), pp. 30–32.

*Primary Examiner*—David R. Hudspeth
*Assistant Examiner*—Tālivaldis Ivars Šmits
*Attorney, Agent, or Firm*—Scully, Scott Murphy & Presser

[57]              ABSTRACT

An audio coding device which includes an analyzing unit for conducting frequency analyses of an input audio signal, a bit weighting unit for generating a weight signal based on an analysis signal, and a filter for converting an input audio signal into a plurality of frequency band signals. The audio coding device also has a bit allocating unit for generating quantization data from a frequency band signal based on a value of a weight signal, and a frame packing unit for generating compression data from quantization data and outputting the compression data. A frame completion determining unit determines whether weight allocation processing is normally completed or not, and a storage unit stores the last weight signal recognized as having weight allocation processing normally completed. Further, a switching unit supplies the bit allocating unit with a weight signal stored in the storage unit in place of a weight signal generated by the bit weighting unit according to the determination results of the frame completion determining unit.

6 Claims, 6 Drawing Sheets

MEMORY REDUCTION FOR ERROR CONCEALMENT IN SUBBAND AUDIO CODERS BY USING LATEST COMPLETE FRAME BIT ALLOCATION PATTERN OR SUBFRAME DECODING RESULT

BACKGROUND OF THE INVENTION

1. Field of the Invention

The present invention relates to an audio coding device for coding an audio signal and an audio decoding device for decoding a coded audio signal and, more particularly, to an audio coding device and an audio decoding device which conduct highly efficient audio coding and decoding such as MPEG audio systems or the like.

2. Description of the Related Art

Known as an audio signal coding system for television and the like is MPEG (Moving Picture Expert Group) whose standardization was studied by ISO/IEC,JTC1/SC2/WG8. One of the MPEG (hereinafter referred to as MPEG audio) standards which is provided for in the recommendation ISO/IEC-11172-3 (1993) prescribes a decoder for coded audio signals.

In highly efficient audio coding, such as MPEG audio and the like, efforts have been made to reduce information size in order to prevent the amount of information from increasing. It is conventionally a common method to conduct quantization bit weight processing within a period of a unit frame and allocate a quantization bit number to each frequency band.

Figure 5:
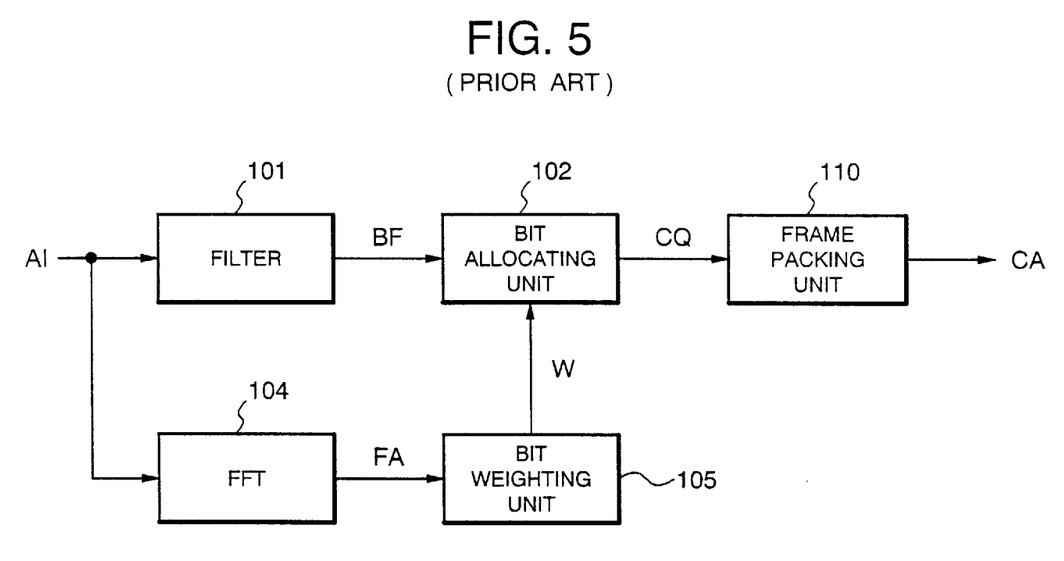
FIG. 5 is a block diagram showing the structure of a conventional audio coding device.

An example of a structure of a conventional audio coding device is shown in FIG. 5 for coding an audio signal according to MPEG audio standards. With reference to FIG. 5, the conventional audio coding device includes a filter 101 which divides a band of an input audio signal AI and outputs a band signal BF at each of 5 frequency bands. A bit allocating unit 102 receives the band signal BF and a weight signal. The bit allocating unit 102 uses the subband bit allocation pattern signal, hereinafter referred to as a weight signal W, for allocating a quantization bit number for weighting each band signal BF, which is quantized to generate quantization data CQ. A frame packing unit 110 receives the quantization data CQ and outputs a compression signal CA according to the MPEG standards. A Fast Fourier Transform (hereinafter referred to as FFT) circuit 104 conducts frequency analyses of the input audio signal AI and provides an analysis signal FA to a bit weighting unit 105, which determines a weight corresponding to auditory characteristics, and provides the weight signal W to the bit allocating unit 102.

Operation of the conventional audio coding device is as follows. First, the applied audio signal AI is supplied to the FFT 104 and the filter 101. The FFT 104 conducts frequency analyses of the input audio signal AI and provides the analysis signal FA to the bit weighting unit.105. Utilizing auditory characteristics such as Fletcher-Munson characteristics, the bit weighting unit 105 determines a weight for frequency correction based on the data of the analysis signal FA to output the weight signal W.

The filter 101 divides the input audio signal AI into a plurality of frequency bands, each band having a fixed frequency width, and supplies the band signal BF to the bit allocating unit 102. The bit allocating unit 102 allocates a quantization bit number to the band signal BF of each frequency band and quantizes the band signal BF based on the weight signal W received from the bit weighting unit 105, as well as other information such as transmission rate of a compressed signal, to generate quantization data CQ. The frame packing unit 110 adds incidental information to the quantization data CQ to generate and output the compression data CA.

Here, the bit weight allocation processing conducted by the FFT 104, the bit weighting unit 105, and the bit allocating unit 102, varies considerably in time according to the amount of data of the analysis signal FA. There is a case where the time required for processing is so long that processing is not completed within a prescribed time of a unit frame period. In this case, the value of the bit weight signal W is indeterminate and causes a severe bit allocation error in the compression data CA. This error is the main factor which contributes to generation of quantization noise.

In addition, during coded audio signal decoding when a severe bit error of compression data is detected in a current frame, which error has resulted from unstable bit weighting as described above, an entire previous frame is decoded again. The previous frame is stored in a frame storing circuit immediately before the current frame with the detected bit error. This twice decoded previous frame is now the decoder output in place of the current frame with the error, in order to prevent noise generation resulting from the bit error.

Figure 6:
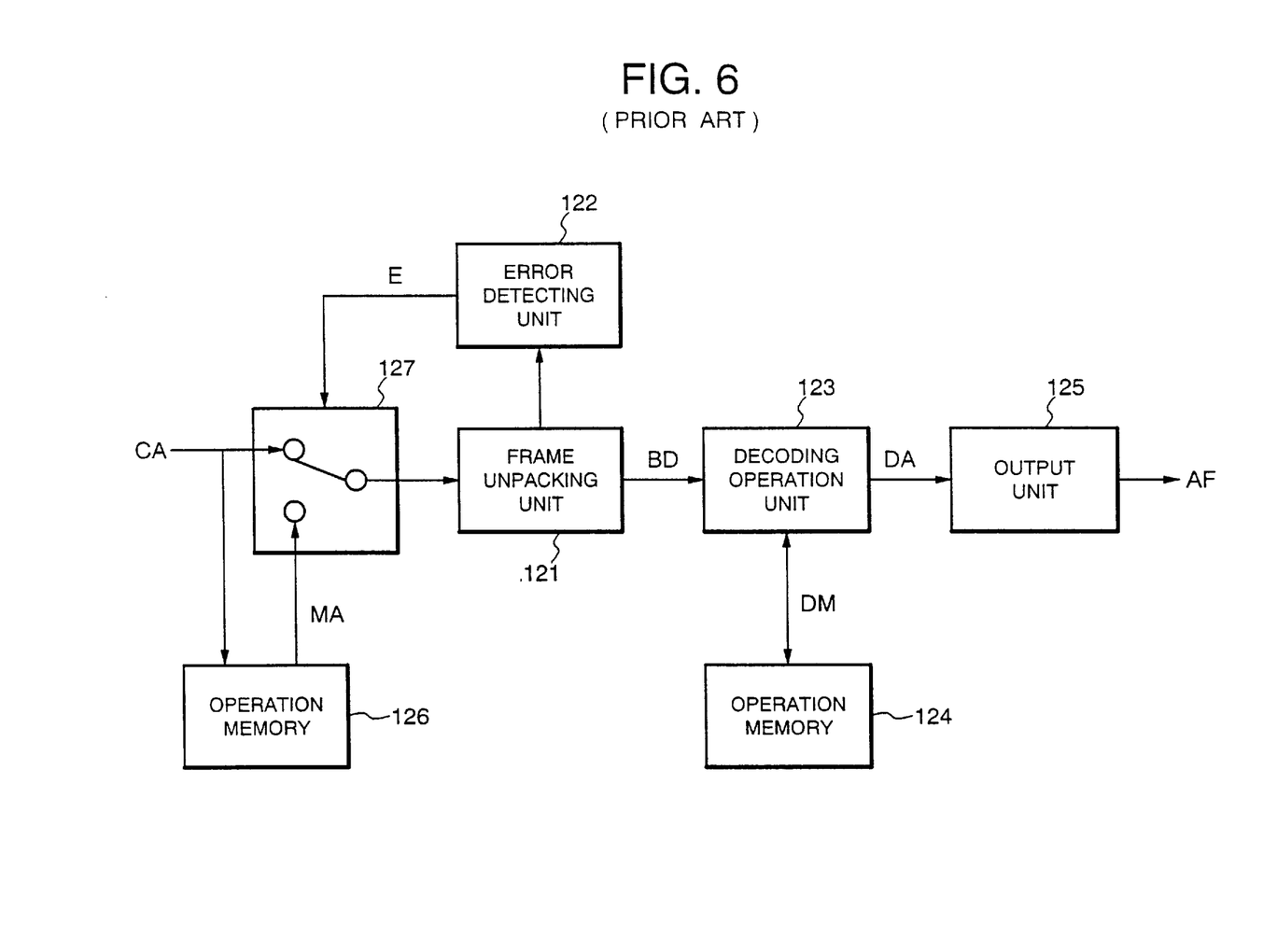
FIG. 6 is a block diagram showing the structure of a conventional audio decoding device.

FIG. 6 shows an example of a conventional audio decoding device for decoding an audio signal which is coded according to the MPEG standards. With reference to FIG. 6, the conventional audio decoding device includes a frame unpacking unit 121 for unpacking received compression data CA of each frame (hereinafter, referred to as current frame data) into decodable and operatable block data BD. The frame unpacking unit 21 supplies a decoding operation unit 123 and an error detecting unit 122 with the block data BD. The error detecting unit 122 outputs an error signal E upon detecting an error in the received block data BD. The decoding operation unit 123 decodes the received block data BD and outputs decoded data DA and interim operation data DM. An operation memory 124 stores the interim operation data DM. An output unit 125 converts the data DA into audio data AF. The conventional audio decoding device also includes a frame memory 126 for storing current frame data CA, which is input on a frame basis, and outputs memory data MA which is compressed data of a frame immediately before the current frame data CA (herein after referred to as a previous frame). A switch 127 performs selective switching between the current frame data CA and the previous frame data MA and supplies to the current or previous frame unpacking unit 121. For MPEG audio, typical required memory capacity of the operation memory 124 is approximately 27K bits, while the required memory capacity of the frame memory 126 is approximately 14K bits.

Next, operation of the conventional audio decoding device will be described. In the initial state, the switch 127 selects the current frame data CA. While applied current frame data CA is stored in the frame memory 126, it is supplied to the frame unpacking unit 121 through the switch 127. The frame unpacking unit 121 unpacks the applied current frame data CA into the block data BD according to a prescribed format, and supplies the block data BD to the decoding operation unit 123 and the error detecting unit 122. The decoding operation unit 123 conducts inverse quantization processing and operation processing such as filter operation according to a coding system with respect to the applied block data BD. Then, the decoding operation unit 123 supplies the output unit 125 with the decoded data DA, which is a result of the operation processing. The decoded data DA are sequentially stored in the operation memory 124 as interim operation data DM until operation of one block is completed. In addition, the decoded data DA are output in a lump to the output unit 125. The output unit 125 converts the decoded data DA into an audio signal AF which is modulated using, for example, pulse code modulation (PCM).

The error detecting unit 122 examines block data BD input from the frame detecting unit 21. When detecting an error, such as no synchronizing signal pattern in the block data BD and data format of the block data BD not complying with MPEG standards, the error detecting unit 122 outputs an error signal E to control the switch 127. Upon receiving the error signal E, the switch 127 switches to supply the frame unpacking unit 121 with the previous frame data MA, which is provided from the frame memory 126, instead of the current frame data 24. As a result, the previous frame data MA, which has been recognized as having no error, is divided and decoded in place of the current frame data CA.

As described in the foregoing, in conventional audio coding devices, the quantization bit weight allocation processing time varies considerably depending on the results of the frequency analysis by an FFT. Due to this considerable time variation, processing may not be completed within a prescribed time of a unit frame period in the worst case, rendering the results of weight allocation processing indeterminate. Conventional devices therefore have drawbacks, such that severe quantization bit number allocation error may occur in output compression data to cause serious quantization noise generation.

Further, conventional audio decoding devices require a frame memory capable of storing input compression data of more than one frame, because when an error is detected in input compression data, another decoding of the whole coded data of a previous frame, which is immediately before the current frame with the error, must be conducted.

SUMMARY OF THE INVENTION

A first object of the present invention is to provide an audio coding device capable of monitoring completion of quantization bit weight allocation processing by the end of the input of frame data, and when the weight allocation processing is not completed, conducting bit allocating processing by using a weight signal of the latest frame in which weight allocation processing is completed normally, thereby allocating a quantization bit number without using a weight allocation processing signal which becomes indeterminate due to incompletion of the weight allocation processing.

A second object of the present invention is to provide an audio coding device capable of preventing output of an erroneous compression signal containing quantization noise caused by an error in allocation of a quantization bit number.

A third object of the present invention is to provide an audio decoding device capable, when an error is detected in block data, of conducting decoding operation processing for block data with no error at any time, without provision of a frame memory for storing frame data, by executing decoding operation processing using the latest data recognized as having no error.

A fourth object of the present invention is to provide an audio decoding device having a reduced memory size due to the elimination of a frame memory.

According to one aspect of the invention, the audio coding device for highly efficient audio coding comprises an analyzing means and a bit weighting means.

The analyzing means conducts frequency analyses of an input audio signal on a frame basis to output an analysis signal, and the bit weighting means determines a weight for each bit corresponding to predetermined auditory characteristics based on the analysis signal output from the analyzing means to generate a weight signal for providing a subband bit allocation pattern for each of the frames.

Filter means divide the frequency band of the input audio signal to output a plurality of frequency band signals. A bit allocating means allocates a quantization bit number for weighting to the frequency band signal input through the filter means and quantizes the frequency band signal based on the value of the weight signal generated by the bit weighting means to generate quantization data on the frame basis.

The audio coding device also includes a frame packing means and a frame completion determining means. The frame packing means adds predetermined incidental information to the quantization data generated by the bit allocating means to generate and output compression data. The frame completion determining means determines whether, at the time when input of the input audio signal of a unit frame is finished, bit weight allocation processing for the frame is completed by the bit weighting means.

A storage means is also included for storing a weight signal which is a weight signal of a predetermined unit frame whose coding processing has been conducted before said unit frame being processed, and which is the last weight signal recognized as having bit weight allocation processing normally completed at the time point when input of said unit frame is finished.

In addition, the audio coding device includes a switching means. If at the time point when input of the unit frame being processed is finished, the bit weight allocation processing for the frame by the bit weighting means is not completed based on the determination results of the frame completion determining means, then the switching means supplies the weight signal stored in the storage means to the bit allocating means in place of the weight signal for the frame generated by the bit weighting means.

According to another aspect of the invention, an audio decoding device for decoding a coded audio signal comprises a frame unpacking means and error detecting means.

The frame unpacking means unpacks input coded compression data of a unit frame into block data of decodable and operatable size and outputs the block data.

The error detecting means receives an input of the block data output from the frame unpacking means to detect the existence/non-existence of an error.

A storage means is provided for operation for use in decoding operation of the block data from the frame unpacking means.

A decoding operation means receives input of the block data output from the frame unpacking means to conduct a decoding operation, sequentially stores individual operation results as interim operation data in the storage means, and when operation of one block is finished, outputs the interim operation data of the one block stored in the storage means, as decoded data.

An output means converts the decoded data output from the decoding operation means into audio data and outputs the audio data. A block data storing means stores the decoded data output from the decoding operation means.

When an error is detected in the block data by the error detecting means, a switching means supplies the decoded or the interim data of the previous processing cycle stored in the block data storing means to the decoding operation means in place of the block data output from the frame unpacking means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but for explanation and understanding only.

In the drawings.

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail to prevent unnecessary obscuring of the present invention.

Figure 1:
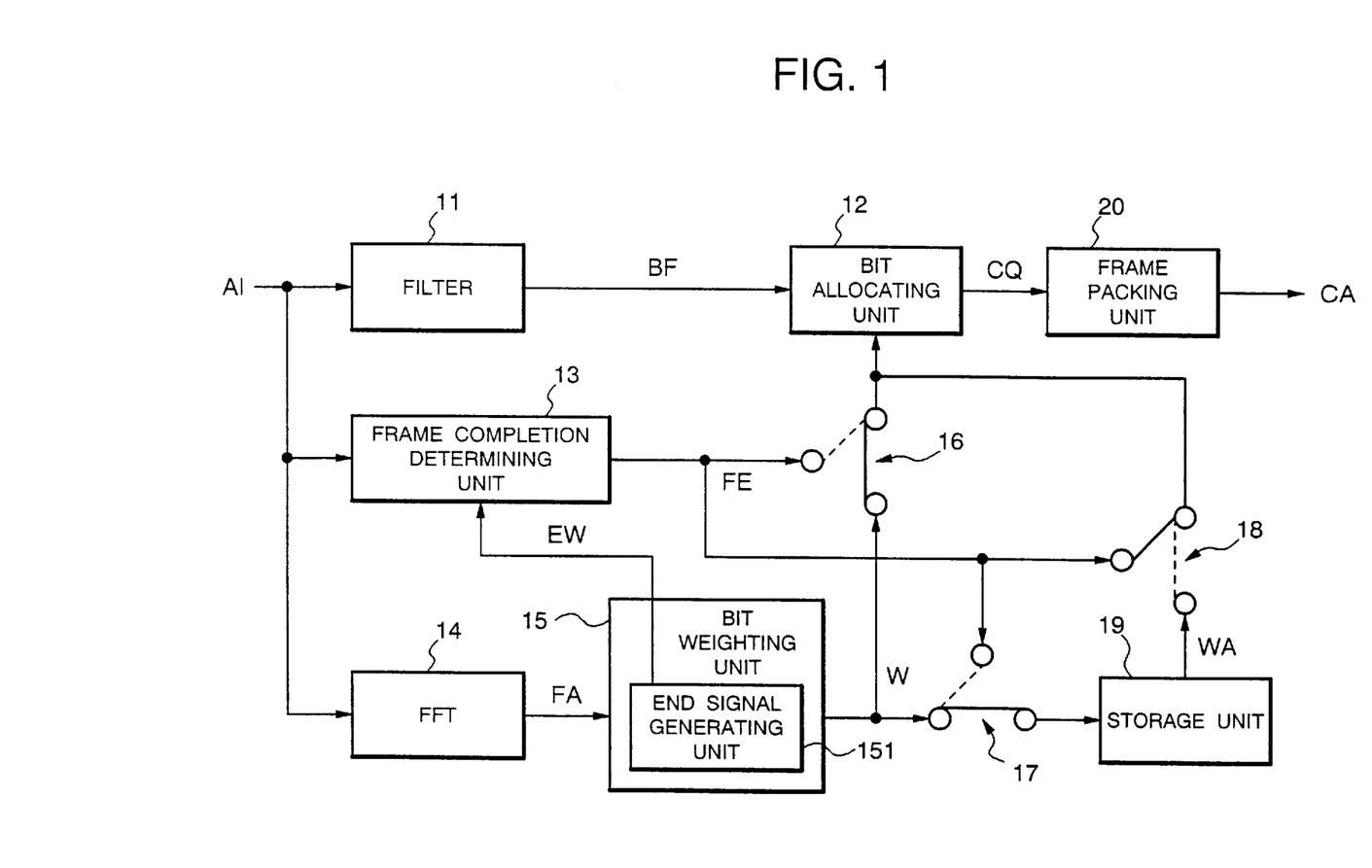
FIG. 1 is a block diagram showing the structure of an audio coding device according to one embodiment of the present invention.

In the following, descriptions are given separately of an audio coding device and an audio decoding device. FIG. 1 is a block diagram showing the structure of an audio coding device according to one embodiment of the present invention.

As illustrated in the figure, the audio coding device of the present embodiment includes a filter 11 for dividing a band of an input audio signal AI to output a band signal BF of each frequency. A bit allocating unit 12 allocates a quantization bit number for weighting to each band signal BF and quantizing the band signal corresponding to a value of a weight signal W to generate quantization data CQ. An FFT 14 conducts frequency analyses of the input audio signal AI to output an analysis signal FA. A bit weighting unit 15 determines a weight corresponding to auditory characteristics based on the analysis signal FA to output a weight signal W. A storage unit 19 stores a weight signal WA of an immediately before frame completed normally. A frame completion determining unit 13 and switches 16, 17 and 18 determine whether weight allocation processing by the bit weighting unit 15 is normally completed or not to control switching of a weight signal to be supplied to the bit allocating unit 12. A frame packing unit 20 generates and outputs a compression signal CA according to the MPEG standards based on the quantization data CQ. In FIG. 1, illustration is made only of the characteristic part of the structure of the present embodiment, and that of other common parts are omitted.

In the above-described structure, the filter 11, FFT 14 and the frame packing unit 20 are the same as their counterpart components in the conventional audio coding device shown in FIG. 5. The filter 11, which is comprised of a plurality of band-pass filters, divides a band of the input audio signal AI to output a band signal BF of each frequency band. FFT 14 conducts frequency analyses of the input audio signal AI to output an analysis signal FA. The frame packing unit 20, which is implemented by a program-controlled CPU or the like, outputs a compression signal CA generated based on the quantization data CQ.

The bit weighting unit 15, which is implemented by a program-controlled CPU or the like, as well as the bit weighting unit 15 in the conventional audio coding device, conducts weight allocation corresponding to auditory characteristics. It further includes an end signal generating unit 151 responsive to a weight signal W generated upon completion of the weight allocation processing for generating an end signal EW indicative of the end of weight allocation processing to supply the end signal EW to the frame completion determining unit 13.

The storage unit 19, which is implemented by a memory such as a RAM, stores and holds the weight signal W for the frame in question when weight allocation processing by the bit weighting unit 15 is normally completed, and then outputs the held weight signal WA until the weight signal W for a new frame is input.

The frame completion determining unit 13, which is implemented by a program-controlled CPU or the like, receives the audio signal AI and the end signal EW, which is supplied from the bit weighting unit 15, to determine whether the bit weight allocation processing by the bit weighting unit 15 is completed or not when the audio signal AI of a unit frame ends. Then, when the bit weight allocation processing is normally completed, the frame completion determining unit 13 outputs a frame completion determination signal FE to control switches 16, 17 and 18.

The switch 16 switches under the control of the frame completion determining unit 13. More specifically, when receiving a frame completion determination signal FE, the switch supplies the bit allocating unit 12 with the weight signal W provided from the bit weighting unit 15. When receiving no frame completion determination signal FE, the switch 16 opens the connection between the bit weighting unit 15 and the bit allocating unit 12. Therefore, if bit weight allocation processing by the bit weighting unit 15 is completed when the receipt of the audio signal AI of a unit frame is finished, and no frame completion determination signal FE is provided from the frame completion determining unit 13, then the weight signal W, which is the result of the bit weight allocation processing with respect to the frame, is not supplied to the bit allocating unit 12.

The switch 17 also switches under the control of the frame completion determining unit 13. More specifically, when receiving the frame completion determination signal FE, the switch 17 supplies the storage unit 19 with the weight signal W provided from the bit weighting unit 15. When receiving no frame completion determination signal FE, the switch 17 opens the connection between the bit weighting unit 15 and the storage unit 19. Therefore, if bit weight allocation processing by the bit weighting unit 15 is completed when the receipt of the audio signal AI of a unit frame is finished, and no frame completion determination signal FE is provided from the frame completion determining unit 13, then the weight signal W, which is the result of the bit weight allocation processing with respect to the frame, is not supplied to the storage unit.

The switch 18 is also switched under the control of the frame completion determining unit 13. More specifically, when receiving the frame completion determination signal FE, the switch 18 opens the connection between the storage unit 19 and the frame packing unit 20. When receiving no frame completion determination signal FE, the switch 18 supplies the frame packing unit 20 with the weight signal WA provided from the storage unit 19. The weight signal WA stored in the storage unit 19 is the latest weight signal recognized as having bit weight allocation processing by the bit weighting unit 15 normally completed when the receipt of the audio signal AI of a unit frame is finished. Therefore, when no frame completion determination signal FE is provided from the frame completion determining unit 13, the switches 16, 17 and 18 are in such positions that the weight signal WA with respect to an immediately before, or previous, frame recognized as having weight allocation processing normally completed, is supplied to the bit allocating unit 12 instead of the weight signal W for the frame in question.

Figure 2:
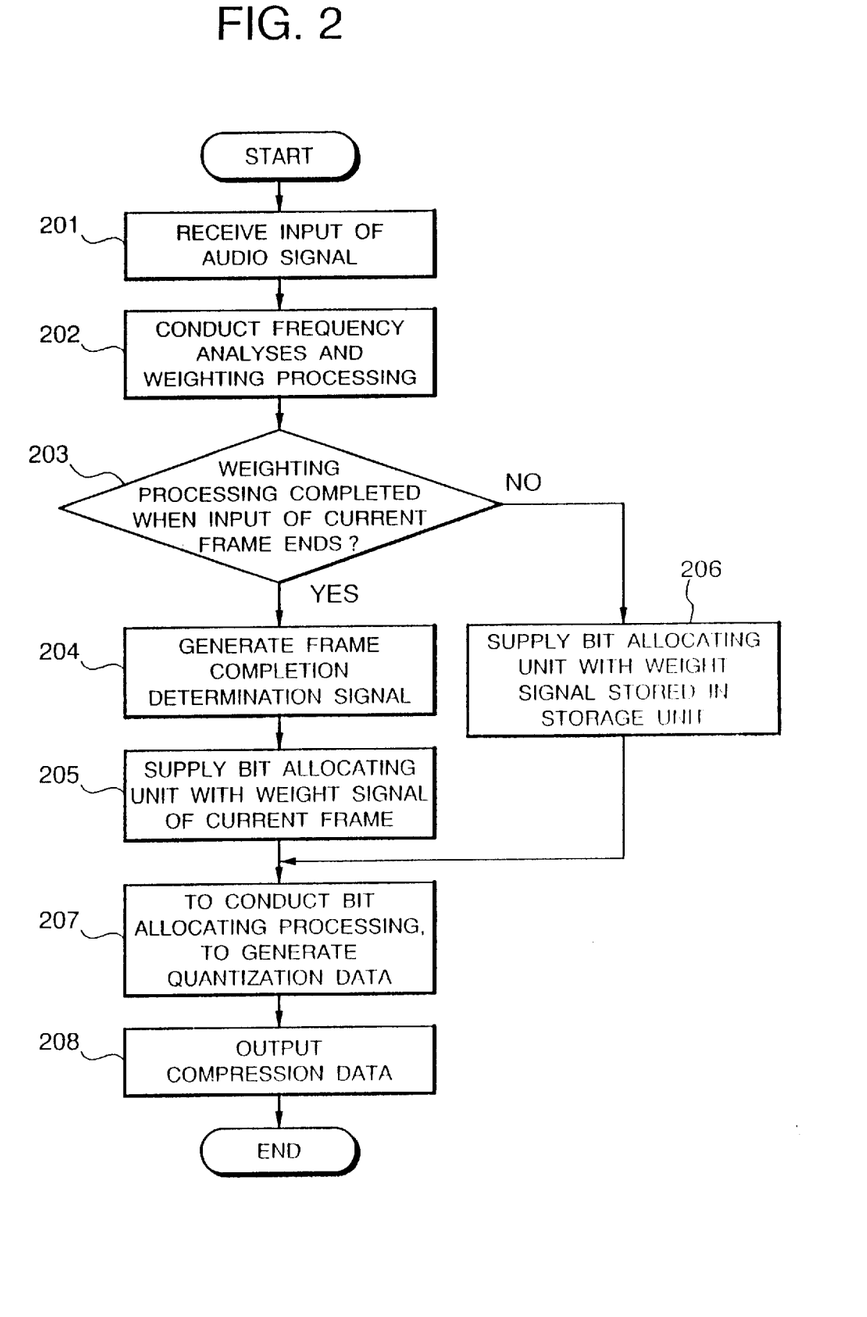
FIG. 2 is a flow chart showing the operation of the audio coding device of the present embodiment.

Operation of the present embodiment will be described in the following with reference to the flow chart shown in FIG. 2.

First, the applied audio signal AI of a unit frame is divided into three and supplied to the FET 14, the filter 11 and the frame completion determining unit (Step 201). The FFT 14 conducts frequency analyses of the audio signal AI and supplies the obtained analysis signal FA to the bit weighting unit 15. Then, upon receiving the analysis signal FA, the bit weighting unit 15 determines the weight for the frequency correction to output the weight signal W as is done in a conventional device (Step 202). The end signal generating unit 151 of the bit weighting unit 15 generates and outputs an end signal EW on condition that the weight signal W is generated.

On the other hand, the filter 11 divides the input audio signal AI into a plurality of frequency bands with a fixed frequency width and supplies a generated band signal BF to the bit allocating unit 12 (Step 202).

The frame completion determining unit 13 receives an input of the audio signal AI and determines whether, at a time point when it detects the end signal of the frame in question (current frame), it has received, from the bit weighting unit 15, the end signal EW indicating that the weight allocation processing for the current frame has already been finished. If the unit 13 has already received the end signal EW, it outputs a frame completion determination signal FE indicative of a normal completion (Steps 203 and 204). Then, the switches 16, 17 and 18 are controlled by the output frame completion determination signal FE to supply the bit allocating unit 12 and the storage unit 19 with the weight signal W for the frame data of the current frame output from the bit weighting unit 15 (Step 205). In addition, since the switch 18 is opened to be in the position shown in FIG. 1 as a solid line, the weight signal WA output from the storage unit 19 is not supplied to the bit allocating unit 12. The weight signal W with respect to the frame data of the current frame stored in the storage unit 19 is output as the latest weight signal WA recognized as having the weight processing completed normally until a new weight signal is input after the following processing cycle.

On the other hand, when the frame completion determining unit 13 is yet to receive an end signal EW at the time point when it detects the end signal of the current frame, no frame completion determination signal FE is output from the frame completion determining unit, so that the switches 16 and 17 are switched, whereby the weight signal W with respect to the frame data of the current frame is supplied neither to the bit allocating unit 12 nor to the storage unit 19. Instead, the weight signal WA, which is recognized as having the weight allocation processing completed normally and stored in the storage unit 19, is supplied to the bit allocating unit 12 through the switch 18 (Steps 203 and 206).

Next, the bit allocating unit 12 allocates a quantization bit number to a band signal BF of each frequency band applied through the filter 11 and quantizes the band signal BF based on the weight signal W or WA applied under the control of the frame completion determining unit 13, and such information as a transmission rate of a compression signal, to generate and output quantization data CQ (Step 7). Then, the frame packing unit 20 adds incidental information to the quantization data CQ to output the compression data CA (Step 208).

As described in the foregoing, in the audio coding device of the present embodiment, the frame completion determining unit 13 monitors completion of quantization bit weight allocation processing by the end of the input of frame data of a current frame, and when the weight allocation processing is not completed, the unit 13 supplies the bit allocating unit 12 with a weight signal of the latest frame in which weight allocation processing is completed normally. It is therefore possible to allocate a quantization bit number without using a weight allocation processing signal which has become indeterminate due to incompletion of weight allocation processing.

Figure 3:
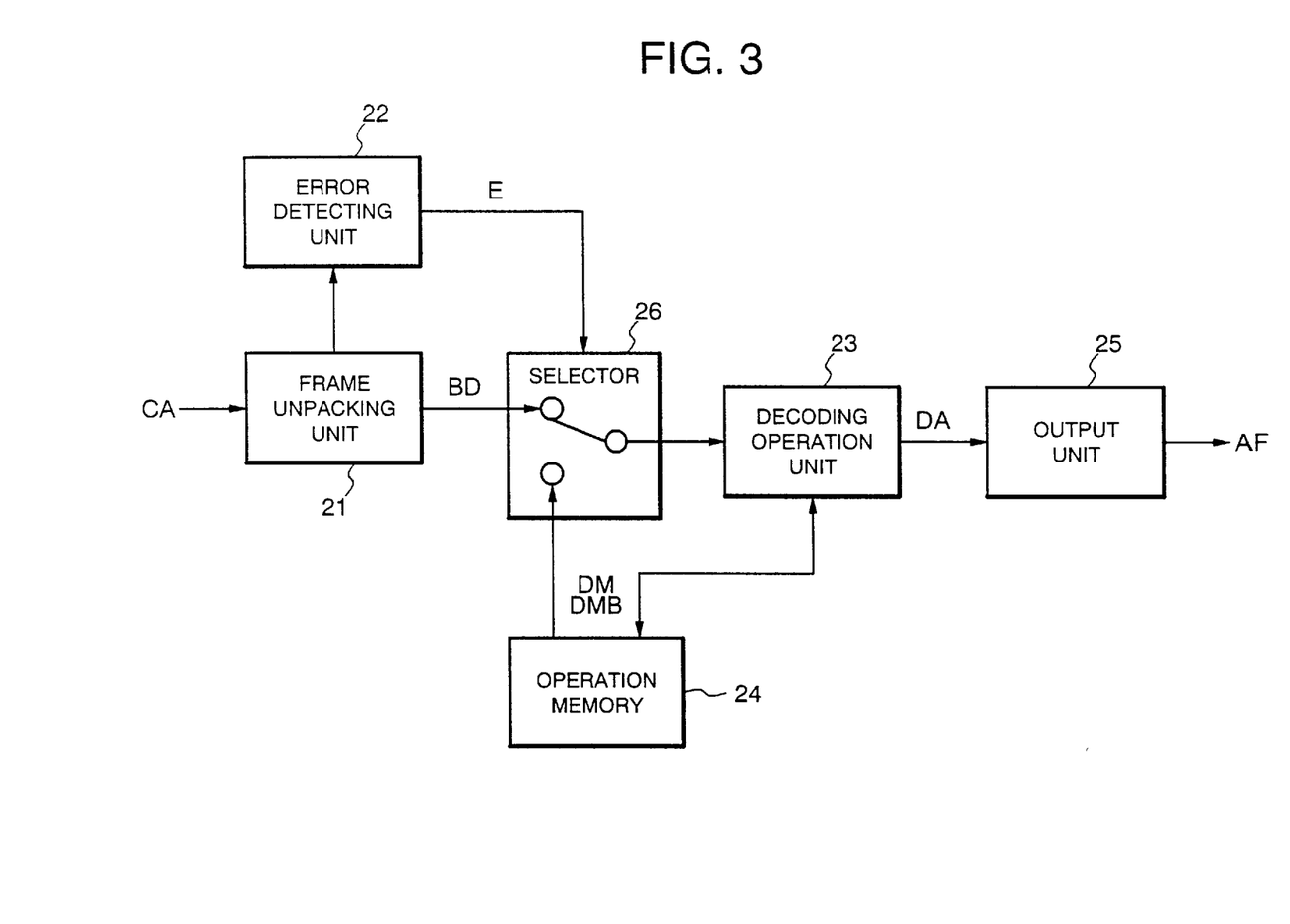
FIG. 3 is a block diagram showing the structure of an audio decoding device according to one embodiment of the present invention.

FIG. 3 is a block diagram showing structure of an audio decoding device according to one embodiment of the present invention.

As illustrated in the figure, the audio decoding device of the present embodiment includes a frame unpacking unit 21 for unpacking applied current frame data CA into block data BD, an error detecting unit 22 for outputting an error signal E when detecting an error in the block data BD, a decoding operation unit 23 for conducting decoding operation with respect to the block data BD to output operation result data DA and interim operation data DM, an operation memory 24 for storing interim operation data DM, an output unit 25 for converting the operation result data DA into audio data AF, and a selector 26 for switching input to the decoding operation unit 23 under the control of the error detecting unit 22. In FIG. 3, illustration is made only of the characteristic components of the present embodiment and that of other common components is omitted.

In the above-described structure, the frame unpacking unit 21, the operation memory 24 and the output unit 25 are the same as their counterpart components in the conventional audio decoding device shown in FIG. 6. The frame unpacking unit 21, which is implemented by a program-controlled CPU or the like, unpacks the current frame data CA into decodable and operatable block data BD for output. The operation memory 24, which is implemented by a memory such as a RAM, stores the interim operation data DM provided from the decoding operation unit 23. The output unit 25, which is implemented by a program controlled CPU or the like, converts the operation result data DA, output from the decoding operation unit 23, into the audio data AI and outputs the data AF.

The error detecting unit 22, which is implemented by a program-controlled CPU or the like, receives and examines the block data BD output from the frame unpacking unit 21 and when detecting an error, outputs an error signal E to control the selector 26 which will be described later.

The decoding operation unit 23, which is implemented by a program-controlled CPU or the like, conducts inverse quantization processing and decoding operations using filter operation or the like with respect to the block data BD or interim block data DMB applied through the selector 26 according to a coding system of the block data in question, and outputs operation result data DA. Operation results are sequentially stored as interim operation data DM in the operation memory 24 until operation of one block is completed, and are sent in a lump as operation result data DA to the output unit 25 at a time point when the operation results of one block are obtained. As a result, at the time point when the operation result data DA is output, the operation results of one block are stored as interim operation data DM in the operation memory 24. The interim operation data DM of one block in this case is referred to as interim block data DMB.

The selector 26 is controlled by the error signal E output from the error detecting unit 22, and selectively switches and supplies the block data BD output from the frame unpacking unit 21, or the interim block data DMB stored in the operation memory 24, to the decoding operation unit 23. More specifically, the selector 26 ordinarily supplies the block data BD output from the frame unpacking unit 21 to the decoding operation unit 23. However, when receiving the error signal E from the error detecting unit 22, the selector 26 switches to supply the interim block data DMB stored in the operation memory 24 to the decoding operation unit 23.

Here, the interim block data DMB stored in the operation memory 24 is block data which was a target for decoding operation processing by the decoding operation unit 23 before the processing for the block data BD in question, and is the last block data that is recognized as having no error. when an error is detected in the block data BD, therefore, the immediately before or previous block data, namely the interim block data DMB, which is without error, is supplied to the decoding operation unit in place of the block data BD in question. As a result, the decoding operation unit 23 will always conduct decoding operation processing with respect to block data with no error.

Figure 4:
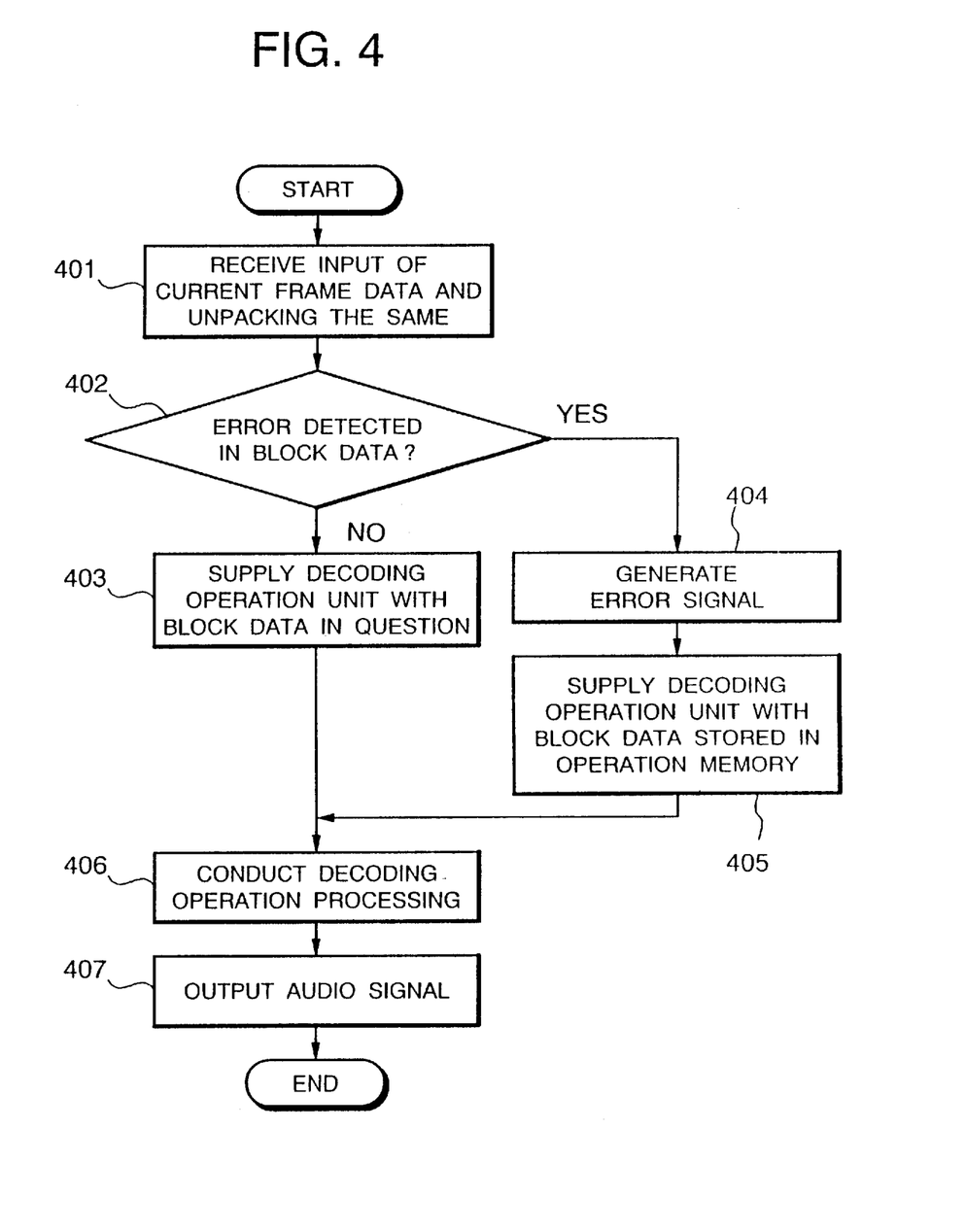
FIG. 4 is a flow chart showing the operation of the audio decoding device of the present embodiment.

Next, operation of the present embodiment will be described with reference to the flow chart shown in FIG. 4.

In the initial state, the selector 26 selects the block data BD which is an output of the frame unpacking unit 21. Upon receiving the current frame data CA, the frame unpacking unit 21 unpacks the applied current frame data CA into the block data BD decodable according to a prescribed format, and outputs the block data BD to the selector 26 and the error detecting unit 122 (Step 401).

When no error is included in the block data BD, no error signal E is output from the error detecting unit 22, and the block data BD is supplied to the decoding operation unit 23 (Steps 402 and 403).

On the other hand, when an error is included in the block data BD, the error detecting unit 22 outputs an error signal E to control the selector 26 upon detecting the error (Steps 402 and 404). Upon receiving the error signal E, the selector 26 switches. Then, the interim block data DMB stored in the operation memory 24 is supplied to the decoding operation unit 23 (Step 405).

Next, the decoding operation unit 23 conducts decoding operation processing with respect to the applied block data BD or interim block data DMB (Step 406). Then, the unit 23 stores operation results as interim operation data DM in the operation memory 24 and supplies the operation result data DA to the output unit 25 at the time point when operation results of one block are obtained. The output unit 25 converts the applied operation result data DA into a audio signal AF, such as PCM, and outputs the signal (Step 407).

Here, when an error is detected in the block data BD output from the frame unpacking unit 21, the interim block data DMB is supplied (in place of the block data BD in question) to the decoding operation unit 23, and is used to form an operation result of one block output in an immediately before processing cycle. The interim block data DMB is accordingly the block data of a block located immediately before the block data BD in question which contains an error. In a case where errors are successively included in several block data BD, decoding operation processing is repeated with respect to the interim block data DMB obtained from the operation memory 24, so that the last block data of which decoding operation has been normally conducted without detection of error will be repeatedly used. In other words, when there are successive errors, decoding operation processing will be repeated with respect to the same block data until a current block data BD with no error is supplied from the frame unpacking unit 21.

As described in the foregoing, in the audio decoding device of the present embodiment, since the selector 26, when an error is detected in block data, supplies the last block data (i.e., the interim block data DMB), which is recognized as having no error, to the decoding operation unit 23 under the control of the error detecting unit 22, error free decoding operation processing is possible at any time without the need for a frame memory for storing frame data.

Ordinary audio signals have frequencies varying a little with time. In the audio coding device and the audio decoding device according to the present embodiment, therefore, when an error occurs in weight allocation processing of data, and if processing using data immediately before the data where the error occurs is repeatedly conducted, degradation in auditory audio quality will be barely sensed.

Although the description has been made separately of the audio coding device and the audio decoding devices in the foregoing, it will be understood that various audio processing devices for coding and processing audio signals such as television may include the above-described audio coding device and audio decoding device in an input/output unit.

As described in the foregoing, the audio coding device of the present invention monitors completion of quantization bit weight allocation processing by the end of the input of frame data, and when the weight allocation processing fails to be finished, it conducts bit allocation processing using a weight signal of the latest frame in which weight allocation processing is normally finished. It is, therefore, possible to allocate the quantization bit number without using a weight allocation processing signal which has become indeterminate due to incompletion of the weight allocation processing, whereby output of an erroneous compression signal can be prevented which includes a quantization noise resulting from an error in the allocation of the quantization bit number.

Moreover, in the audio decoding device of the present invention, when an error is detected in block data, decoding operation processing can be conducted using the latest block data recognized as having no error. As a result, decoding operation processing can be conducted at any time with respect to block data having no error while the necessary memory size is reduced since a frame memory for storing frame data is not needed.

Although the invention has been illustrated and described with respect to an exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments and equivalents thereof with respect to the features set out in the appended claims.

What is claimed is:

1. An audio coding device for highly efficient audio coding, comprising:

analyzing means for conducting frequency analyses of an input audio signal having frames on a frame basis to output an analysis signal, bit weighting means for determining a weight for each bit corresponding to predetermined auditory characteristics based on said analysis signal output from said analyzing means to generate a weight signal for providing a sub-band bit allocation pattern for each of said frames, filter means for dividing a frequency band of said input audio signal to output a plurality of frequency band signals, bit allocating means for allocating a quantization bit number for weighting to said frequency band signal input through said filter means and quantizing said frequency band signal based on the value of the weight signal generated by said bit weighting means to generate quantization data on said frame basis, frame packing means for adding predetermined incidental information to the quantization data generated by said bit allocating means to generate and output compression data, frame completion determining means for determining whether, at the time point when input of said input audio signal of a unit frame is finished, bit weigh allocation processing for the frame is completed by said bit weighting means, storage means for storing a stored weight signal of a predetermined unit frame whose coding processing has been conducted before said unit frame being processed and which is the last weight signal recognized as having bit weight allocation processing normally completed at the time point when input of said unit frame is finished, and switching means for, if at the time point when input of said unit frame being processed is finished, bit weight allocation processing for the frame by said bit weighting means is not completed based on the determination results of said frame completion determining means, supplying said stored weight signal to said bit allocating means in place of the weight signal for said frame generated by said bit weighting means.

2. The audio coding device as set forth in claim 1, wherein said switching means switches connection of a circuit which connects said bit weighting means with said bit allocating means and said storage means and connection of a circuit which connects said storage means with said bit allocating means, and wherein said switching means, when determination is made that at a time point when said frame completion determining means finishes input of said unit frame being processed, bit weight allocation processing for said frame is completed by said bit weighting means, connects a circuit for supplying the weight signal output from said bit weighting means to said bit allocating means and said storage means and cuts off a circuit for supplying the weight signal stored in said storage means to said bit allocating means, and wherein said switching means, when determination is made that at a time point when said frame completion determining means finishes input of said unit frame being processed, bit weight allocation processing for said frame is not completed by said bit weighting means, cuts off the circuit for supplying the weight signal output from said bit weighting means to said bit allocating means and said storage means and connects the circuit for supplying the stored weight signal to said bit allocating means.

3. The audio coding device as set forth in claim 1, wherein said switching means switches connection of a circuit which connects said bit weighting means with said bit allocating means and said storage means and switches connection of a circuit which connects said storage means with said bit allocating means, and wherein said switching means, when determination is made that at a time point when said frame completion determining means finishes input of said unit frame being processed, bit weight allocation processing for said frame is completed by said bit weighting means, connects a circuit for supplying the weight signal output from said bit weighting means to said bit allocating means and said storage means and cuts off a circuit for supplying the stored weight signal to said bit allocating means, and wherein said switching means, when determination is made that at a time point when said frame completion determining means finishes input of said unit frame being processed, bit weight allocation processing for said frame is not completed by said bit weighting means, cuts off the circuit for supplying the weight signal output from said bit weighting means to said bit allocating means and said storage means and connects the circuit for supplying the stored weight signal to said bit allocating means, and wherein said storage means, when receiving supply of the weight signal from said bit weighting means and storing the same by the control of said switching means, holds said stored weight signal until a new weight signal is supplied from said bit weighting means by the control of said switching means.

4. The audio coding device as set forth in claim 1, wherein said bit weighting means includes weighting end signal generating means for outputting a weighting end signal indicative of the end of weighting processing on condition that said bit weighting means ends weighting processing and generates said weight signal, and said frame completion determining means determines that weight allocation processing by said bit weighting means is normally completed when it has received said weighting end signal output from said weighting end signal generating means at a time point when input of said input audio signal of a unit frame is finished.

5. The audio coding device as set forth in claim 1, wherein said bit weighting means includes weighting end signal generating means for outputting a weighting end signal indicative of the end of weight allocation processing on condition that said bit weight allocation means ends weighting processing and generates said weight signal, said frame completion determining means outputs a frame completion determination signal when it has received said weighting end signal output from said weighting end signal generating means at a time point when input of said input audio signal of a unit frame is finished, and said switching means supplies said stored weight signal to said bit allocating means in place of a weight signal generated by said bit weighting means expect when receiving a frame completion determination signal output from said frame completion determining means.

6. The audio coding device as set forth in claim 1, wherein said bit weighting means includes weighting end signal generating means for outputting a weighting end signal indicative of the end of weighting processing on condition that said bit weighting means ends weighting processing and generates said weight signal, said frame completion determining means outputs a frame completion determination signal when it has received said weighting end signal output from said weighting end signal generating means at a time point when input of said input audio signal of a unit frame is finished, and said switching means switches and controls connection of a circuit which connects said bit weighting means with said bit allocating means and said storage means and connection of a circuit which connects said storage means with said bit allocating means, when receiving a frame completion determination signal output from said frame completion determining means, connects a circuit for supplying a weight signal output from said bit weighting means to said bit allocating means and said storage means and cuts off a circuit for supplying a weight signal stored in said storage means to said bit allocating means, and when receiving no frame completion determination signal output from said frame completion determining means, cuts off the circuit for supplying a weight signal output from said bit weighting means to said bit allocating means and said storage means and connects the circuit for supplying a weight signal stored in said storage means to said bit allocating means.

* * * * *